United States Patent [19]

Eichinger et al.

[11] Patent Number: 4,461,367

[45] Date of Patent: Jul. 24, 1984

[54] DRIVE TRAIN FOR A STEERABLE DRIVE WHEEL OF A VEHICLE

[75] Inventors: Johann Eichinger, Vaterstetten; Richard Strehler, Unterfoehring; Max Bartl, Munich, all of Fed. Rep. of Germany

[73] Assignee: Carl Hurth Maschinen- und Zahnradfabrik GmbH & Co., Munich, Fed. Rep. of Germany

[21] Appl. No.: 405,794

[22] Filed: Aug. 6, 1982

[30] Foreign Application Priority Data

Aug. 20, 1981 [DE] Fed. Rep. of Germany ....... 3133027

[51] Int. Cl.³ .......................... B60K 17/30; B62D 5/10
[52] U.S. Cl. .................................... 180/252; 180/65.1; 180/253
[58] Field of Search ...................... 180/252, 253, 65.1, 180/70.1

[56] References Cited

U.S. PATENT DOCUMENTS

| 2,564,002 | 8/1951 | Gibson | 180/253 |
| 3,534,825 | 10/1970 | Reiffle | 180/252 |
| 3,689,101 | 9/1972 | Spence | 180/252 |
| 3,698,504 | 10/1972 | Harvey | 180/253 |

Primary Examiner—Joseph F. Peters, Jr.
Assistant Examiner—Donn McGiehan
Attorney, Agent, or Firm—Flynn, Thiel, Boutell & Tanis

[57] ABSTRACT

A drive train for a steerable drive wheel of a vehicle includes a spur gear stage and a bevel gear stage in a drive train housing which is supported for pivotal movement about a vertical axis. The drive wheel is driven through a horizontal axis from a vertically arranged motor. The housing is divided so that the axle-base change of the spur gear stage which is necessary when changing the drive wheel width requires different parts only for the part of the drive train housing which surrounds the spur gears. The remaining part of the drive train housing, which contains the bevel gear stage, is always the same. A slewing ring can be integral with the housing part which surrounds the spur gears. Furthermore, an opening for supplying or discharging air to or from the motor chamber can be provided.

7 Claims, 5 Drawing Figures

DRIVE TRAIN FOR A STEERABLE DRIVE WHEEL OF A VEHICLE

FIELD OF THE INVENTION

This invention relates to a drive train for a steerable drive wheel of a vehicle.

BACKGROUND OF THE INVENTION

In such drive trains, it has been common up to now to place a lid on top of the drive train housing, on which lid the motor is fastened. The pinion provided on the motor shaft and the gear with which it mates are thus arranged within a kind of a trough or tank which is formed by the drive train housing. This arrangement has the disadvantage that, for various wheel widths, different housings and different lids are needed, which among other things is connected to high model, manufacturing and inventory costs. In the interest of satisfactory steering capability for the vehicle, it is desirable that the swivel axis of the drive train lie approximately in the central plane of rotation of the drive wheel. This requires, for different wheel widths, different axle bases for the spur gear stage and thus different housings and lids.

A basic purpose of the invention is therefore to improve a drive train of the above-mentioned type so that the same housing can be used for various wheel widths and, aside from different spur gears, only one part which can be easily adapted is needed in different applications.

SUMMARY OF THE INVENTION

This purpose is attained by providing a drive train of the foregoing type which includes a drive train housing which can be supported on the vehicle frame for pivotal movement about a vertical axis by a slewing arrangement. The drive train housing includes an upper housing which houses a spur gear stage and a lower housing which houses a bevel gear stage, the upper and lower housings being connected at a junction. A pinion of the spur gear stage is mounted on the drive shaft of a motor which is mounted on the upper housing coaxially with the drive train housing pivot axis. The pinion engages a further gear mounted on a vertical bevel-pinion shaft of the bevel gear stage, which shaft extends across the junction. A bevel gear is mounted on a horizontal driven shaft, one end of which shaft projects from the drive train housing and supports a wheel. The bevel-pinion shaft and the driven shaft are rotatably supported on the lower housing and the slewing arrangement is mounted on the upper housing.

The lower housing remains the same for different wheel widths so that, aside from the need for different spur gears which correspond to the different axle bases, only the upwardly and downwardly open and thus easily adaptable upper housing is needed in different sizes. In the interest of an economical installation of the drive train, the lower housing with the bevel gear drive is advantageously constructed as a preassembled unit. In order to be able to correctly install the bevel-pinion shaft with respect to tooth engagement with a bevel gear on a driven shaft, one of two embodiments is advisable.

The first such embodiment is one in which, for axially holding the bearings and further gear, a common element is provided, and in the preassembled unit the section of the bevel-pinion shaft which supports the further gear is equipped with a sleeve which, during final assembly of the drive train, is replaced with the further gear. In the other such embodiment, separate elements are provided on the bevel-pinion shaft for axially holding the bevel-pinion shaft bearings and the further gear.

The lower housing is designed flangelike at the junction of the two housings. This flange is advantageously designed so that, viewed in the travelling direction, it has in the region in front of and behind a neck which surrounds the bevel-pinion shaft approximately the same thickness as the upper housing has in such region. The junction then lies in a region of low stress and the stresses which are caused by forces in the two housings respectively occur only as compressive or as tensile stresses, but not or only to a very small degree in either of the housings as thrust stresses.

When the inner ring of the slewing arrangement is integral with the upper housing, a reduction of the diameter of the slewing arrangement is achieved, which means further cost savings. Of particular advantage is a development in which an opening is provided to feed cooling air to the motor, to discharge heated air from the motor chamber, or to allow sweat or condensation and spray water to run out of the chamber.

A known drive train typical of some prior art devices is disclosed in British Patent No. 935 201. The separation of the drive train housing there serves the purpose of clamping the slewing arrangement between the upper and the lower housing. The use of different wheel widths without changing many other parts is impossible, as is a preassembly of the lower housing with the bevel gear drive.

BRIEF DESCRIPTION OF THE DRAWINGS

The invention will be described hereinafter in connection with exemplary embodiments which are illustrated in five figures.

In the drawings.

DETAILED DESCRIPTION

Figure 1:
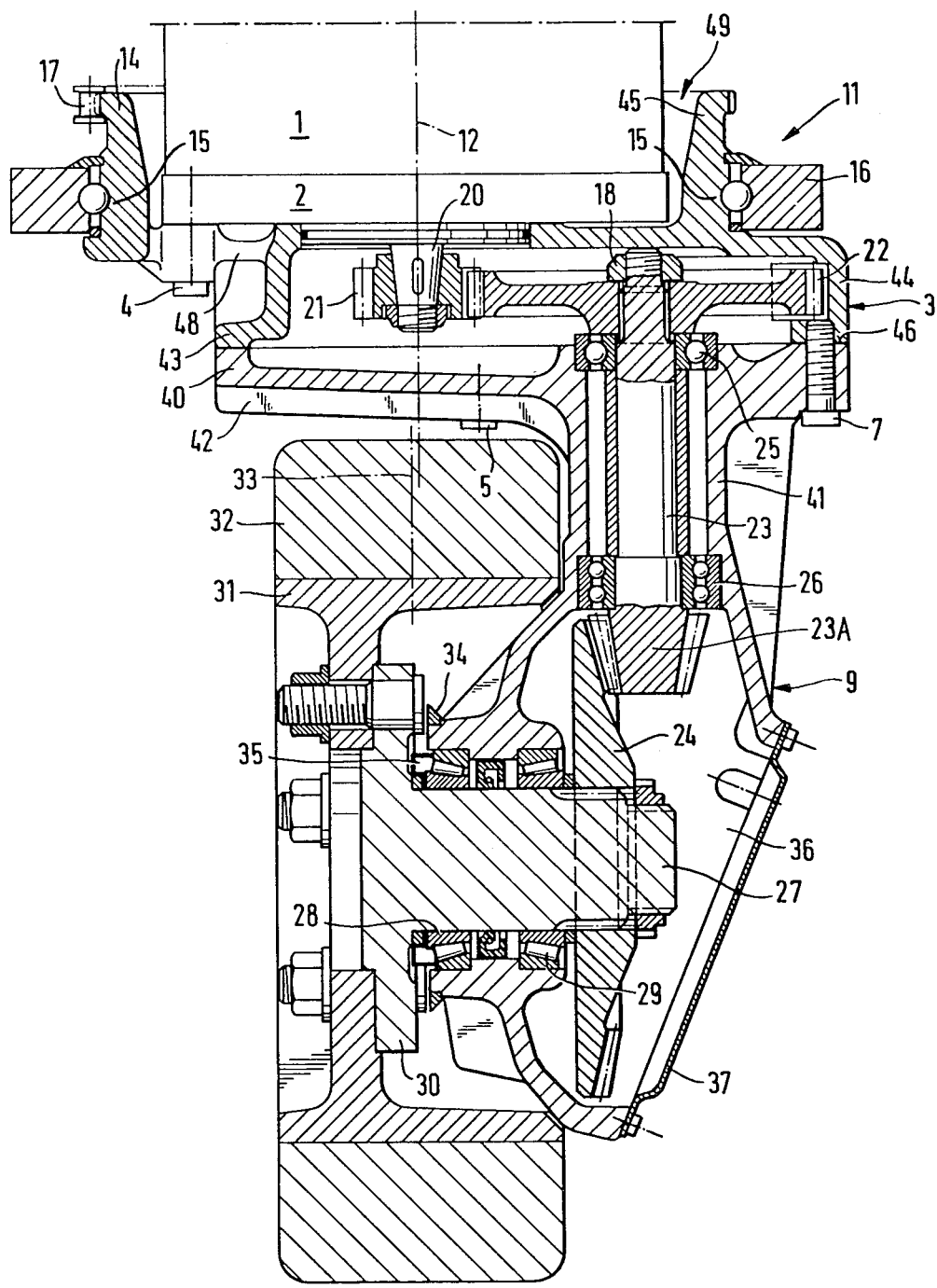
FIG. 1 is a sectional front view of a drive train according to the invention.

An electric motor or E-motor 1 is centered with its support plate 2 in an upper housing 3 and is secured thereto by means of bolts 4 and 5. The bolts 4 and 5 are freely accessible from below and permit removal of the motor 1 without disassembly of the drive train. The upper housing 3 is connected by means of screws 6 and 7 and not illustrated centering pins to a lower housing 9.

The centering pins are provided on one or both of the upper and lower housings 3 and 9, and each is received in an opening provided in the other of the housings.

Figure 3:
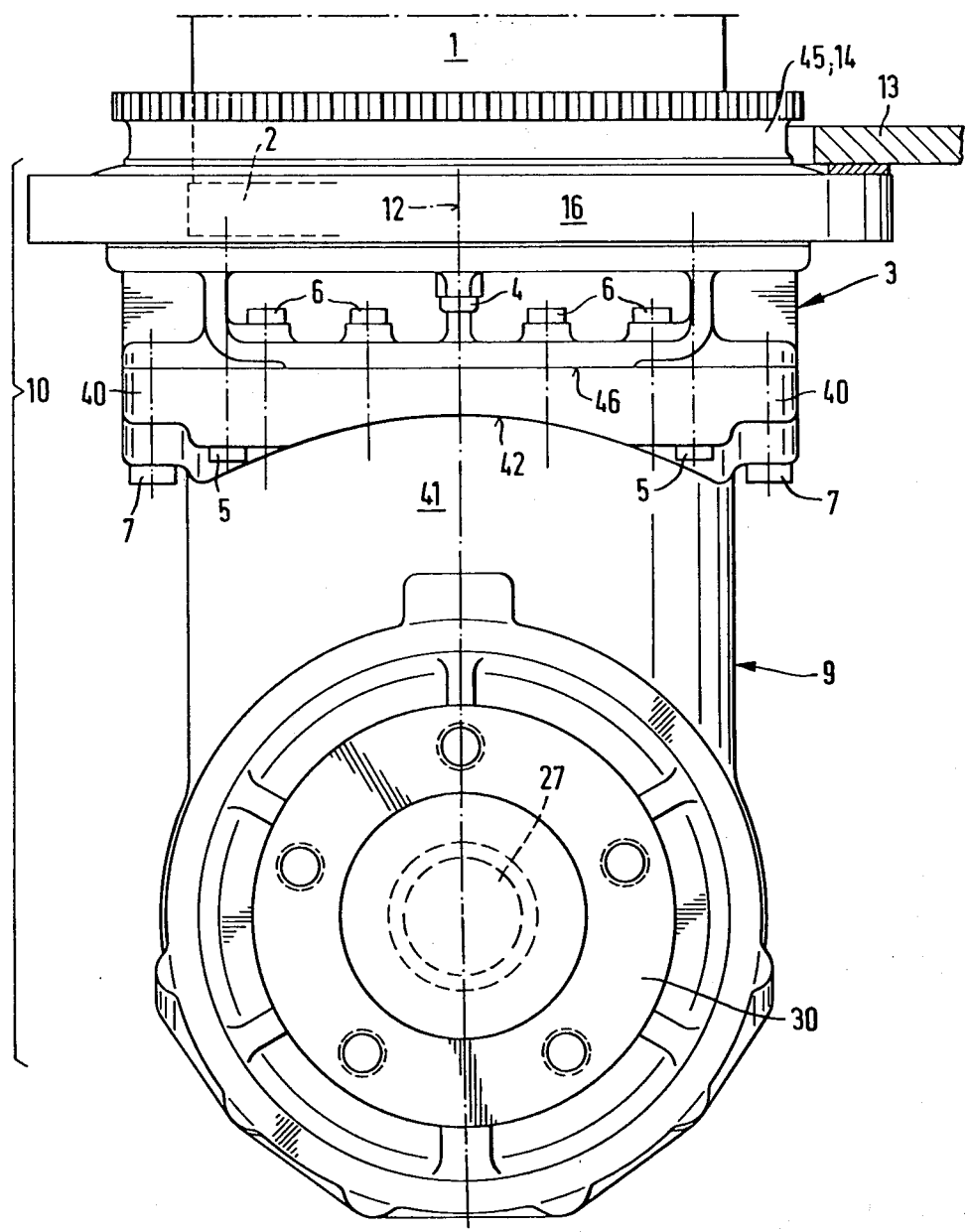
FIG. 3 is a side view of the drive train of FIG. 1, taken in the direction of the arrow III in FIG. 2 and with the drive wheel removed.

The housings 3 and 9 form a drive train housing 10 (FIG. 3). The upper housing 3 is supported in a vehicle 13 for pivotal movement about a vertical axis 12 by a sealed slewing ring arrangement 11. The inner ring 15 thereof is integral with a collar 45 provided on the upper housing 3, and the outer ring 16 is connected in a conventional manner to the vehicle frame 13. The slewing ring arrangement 11 can, as illustrated, be a ball bearing, or alternatively a cross-roller bearing or any similar device. A chain 17 is looped around a toothed collar 14 provided on the upper housing 3, which chain effects pivotal movement of the drive train housing 10 about the axis 12.

A pinion 21 is mounted on the driven shaft 20 of the E-motor 1 and is fixed against rotation with respect thereto. It matingly engages a spur gear 22, which is supported on and fixed against rotation with respect to the upper end of a bevel-pinion shaft 23 and is held against axial direction with respect thereto by a nut 18. The bevel-pinion shaft 23 is rotatably supported in the lower housing 9 by means of bearings 25 and 26. A bevel gear 23A is provided on the lower end thereof, and engages a bevel gear 24 which is supported on and fixed against rotation with respect to an end of a driven shaft 27. The shaft 27 is rotatably supported in the lower housing 9 by means of roller bearings 28 and 29. One end of the driven shaft 27 projects outwardly from the housing 9 and has a radial flange 30 to which is bolted the rim 31 of a drive wheel 32. The axis 12 lies in or at least adjacent the center plane 33 of the drive wheel 32. Sealing rings 34 and 35 prevent oil from exiting the drive train and prevent dirt from entering the drive train. An opening 36 is provided in the side of the housing 9 opposite the flange 30, which opening is closed with a removable lid 37.

Figure 4:
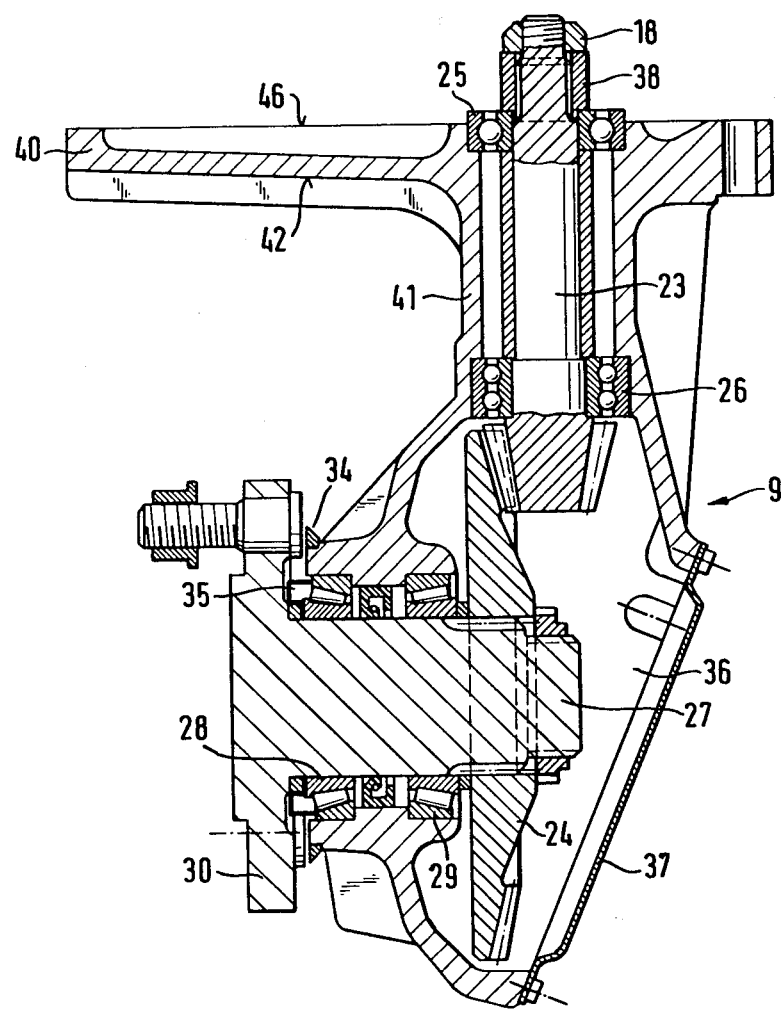
FIG. 4 is a sectional front view of a preassembled unit which is a component of the drive train of FIG. 1 and includes the lower housing and bevel gear drive.

As shown in FIG. 4, the lower housing 9 can, with the bevel gear drive 23 and 24, the driven shaft 27, the bearings 25, 26, 28 and 29, the sealing elements 34 and 35, and the lid 37 be preassembled to form a subassembly unit. A sleeve 38 is provided on the upper end of the bevel-pinion shaft 23 instead of the gear 22. The gear 22 is installed only during final assembly of the drive train, at which time the sleeve 38 is easily removed.

Figure 5:
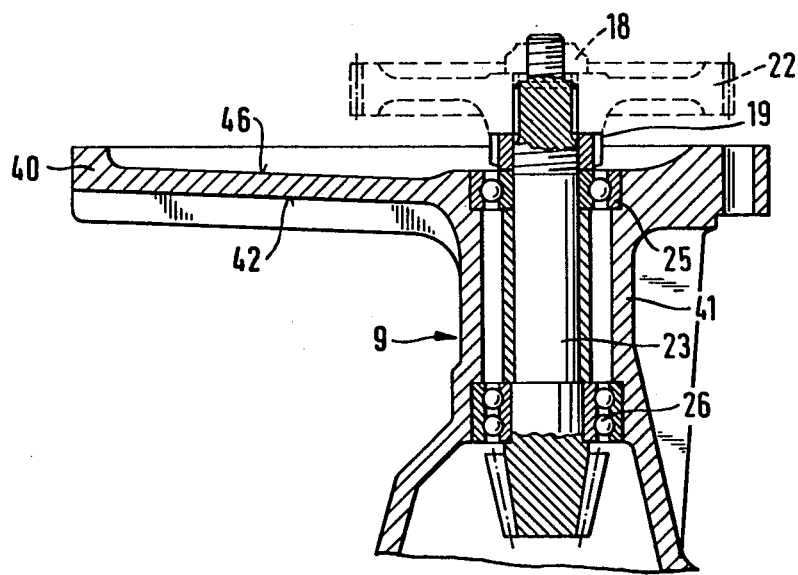
FIG. 5 is a fragmentary sectional front view of an alternative embodiment of the unit of FIG. 4.

A different embodiment is illustrated in FIG. 5 where, for axially holding the bearings 25 and 26, a separate nut 19 is provided and threadedly engages the shaft 23. The gear 22, which is installed later, is supported on the nut 19, and is held against axial movement by the nut 18 or by a different element. Thus, in this embodiment, no sleeve 38 is used during preassembly, so that its removal during final assembly is unnecessary.

Figure 2:
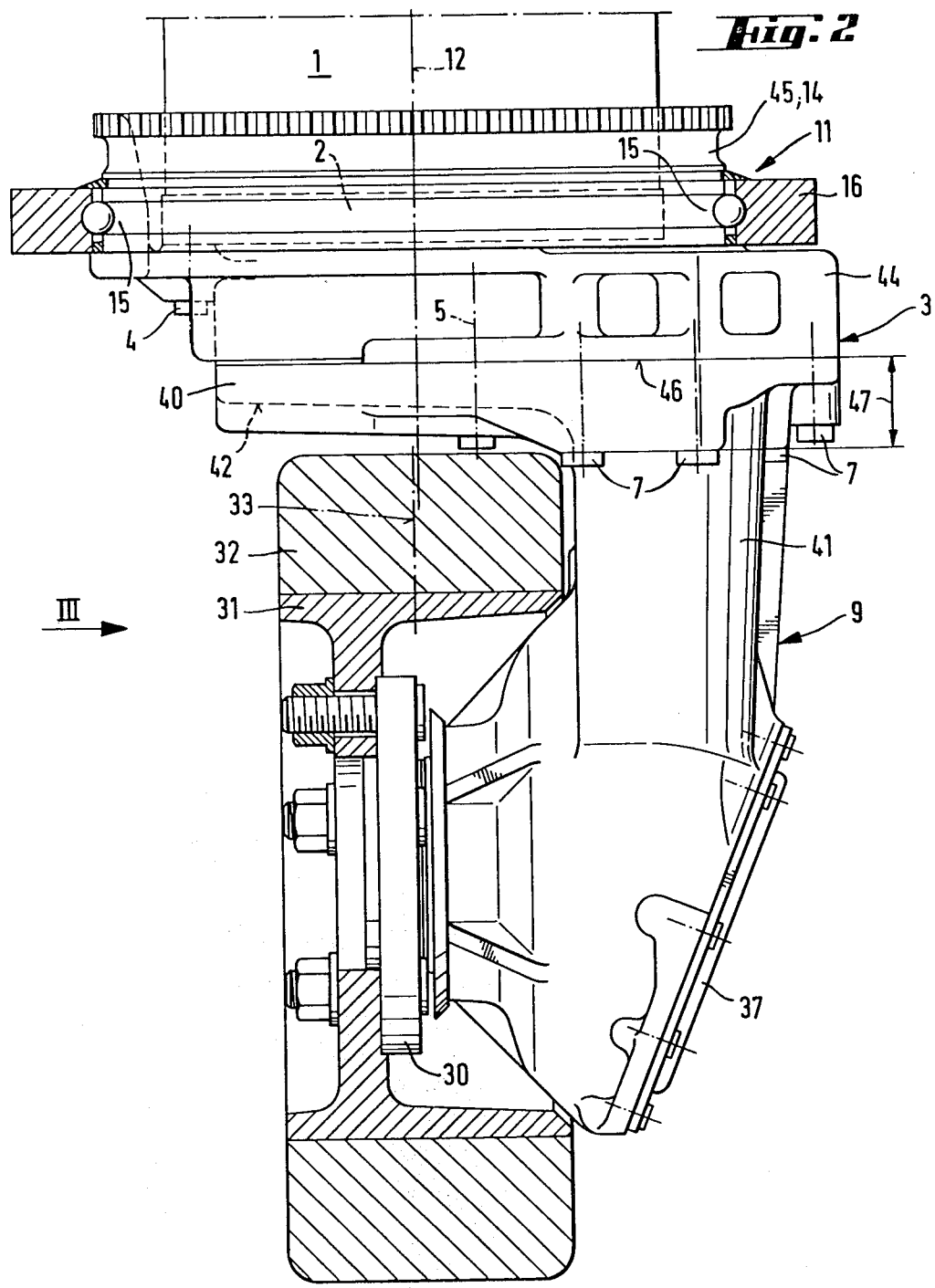
FIG. 2 is a front view of the drive train of FIG. 1, a wheel thereof being shown in section.

As can be seen in FIGS. 1 and 2, the lower housing 9 has in its upper area a neck 41 which surrounds the bevel-pinion shaft 23, and has a hood 42 which is connected to the neck 41 and extends laterally over the drive wheel 32. The neck 41 and the hood 42 transfer over into an upwardly projecting flange 40.

The upper housing 3 has a downwardly open bell 44 which has a downwardly projecting flange 43 at its lower edge. The housing 3 also has the collar 45 thereon which surrounds the E-motor 1.

Bending forces which are due to the vehicle weight and to the motive power cause compressive stresses $\delta_D$ in the lower housing 9 and tensile stresses $\delta_Z$ in the upper housing 3, which stresses have their respective maximums at the transition from the neck 41 to the hood 42 and at the transition from the bell 44 to the collar 45. Breaking of the housings 3 and 9 is effectively prevented by the placement of the junction 46 between the flanges 40 and 43 of the two housings 9 and 3 in the tension-free region of the transition from the compressive stresses to the tensile stresses, or at least in a low stress region. The flange 40 has for this reason at the mentioned transition region approximately the same thickness 47 (FIG. 2) as the bell 44 has at its mentioned transition region.

An opening 48 through the upper housing 3 provides communication from the chamber 49 in which the motor is installed and which is enclosed in an upward direction by not illustrated vehicle parts to the external atmosphere. In this manner, it is possible to supply fresh air to the motor or to discharge heated air from the motor chamber. Furthermore, sweat or condensation and splash water can run out of the chamber 49.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A drive train for a steerable drive wheel of a vehicle, comprising a drive train housing which can be supported on the vehicle frame for pivotal movement about a vertical axis by a slewing arrangement, which drive train housing is divided into an upper housing which houses a spur gear stage and a lower housing which houses a bevel gear stage, the upper and lower housings being connected at a junction, a pinion of the spur gear stage being mounted on the drive shaft of a motor mounted on the upper housing coaxial with the drive train housing pivot axis and engaging a further gear mounted on a vertical bevel-pinion shaft of the bevel gear stage, which shaft extends across the junction, a bevel gear being mounted on a horizontal driven shaft, one end of which driven shaft projects from the drive train housing and supports a drive wheel, the bevel-pinion shaft and the driven shaft being rotatably supported in the lower housing and the slewing arrangement being mounted on the upper housing.

2. The drive train according to claim 1, wherein the lower housing, together with the bevel-pinion shaft and its bearings, the driven shaft and its bearings, and the bevel gear which is provided with seals and lids, are a preassembled unit which can be stored.

3. The drive train according to claim 2, wherein for axially holding the bearings the further gear of the bevel-pinion shaft, a sleeve is provided, and wherein in the preassembled unit the sleeve, during final assembly of the drive train, is replaced with the further gear.

4. The drive train according to claim 1 or claim 2, wherein for axially holding the bevel-pinion shaft bearings on the one hand and the further gear on the other hand, separate nuts are provided on the bevel-pinion shaft.

5. The drive train according to claim 1, wherein the lower housing has a flange at the junction which, viewed in the travelling direction, has in the region in front of and behind a neck which surrounds the bevel-pinion shaft approximately the same thickness as the upper housing has in such region.

6. The drive train according to claim 1, wherein the inner ring of the slewing arrangement is integral with the upper housing.

7. The drive train according to claim 1, wherein the upper housing has an opening through which the motor chamber communicates with the surrounding atmosphere.

* * * * *